3,167,571
MANUFACTURE OF THIOLCARBAMATES
John J. D'Amico, Charleston, and Marion W. Harman, Nitro, W. Va., assignors to Monsanto Company, a corporation of Delaware
No Drawing. Filed July 13, 1959, Ser. No. 826,410
10 Claims. (Cl. 260—455)

The present invention relates to the manufacture of thiolcarbamates and more particularly to the reaction of COS with amines.

It is well known that COS easily hydrolyzes to carbon dioxide and hydrogen sulfide which reaction is catalyzed by bases. In a mixture of gases containing COS, 85–90% of the COS has been hydrolzed with aqueous solutions of 3% sodium hydroxide. Accordingly, condensation of amines with COS has heretofore been carried out under anhydrous conditions. For example, amine salts of thiolcarbamic acids have been prepared by reacting COS with amine in anhydrous ether or absolute alcohol. However, this necessitates using at least two moles of the amine per mole of COS. Often the salt is desired merely as an intermediate for further condensation, as for example condensation with alkyl halides to form esters. Economical operation necessitates recovery of the amine salt constituent. This has been accomplished by converting the amine salt to sodium salt by reaction with sodium hydroxide in aqueous medium but contacting the COS with aqueous alkaline solution has been avoided.

An object of the present invention is to simplify the manufacture of thiolcarbamates. A particular object is to provide a single step process for the manufacture of thiolcarbamates whether soluble metal salts, amine salts or esters of thiolcarbamic acids. A general object is to provide more economical manufacturing methods.

It has been found that COS combines with amines containing active hydrogen in aqueous medium in the presence of excess base. Suprisingly, COS reacts preferentially with primary and secondary amines in aqueous alkaline medium with minimum interference from side reactions, notably base catalyzed hydrolysis of the COS. Free thiolcarbamic acids are unstable under ordinary conditions and sufficient salt forming base must be present to produce a stable product. The base may be the same amine which is converted to a thiolcarbamic acid but cheap inorganic bases are much preferred. Tertiary amines form salts of thiocarbamic acids but do not react with COS. The base in excess of that required for combining with COS should be equivalent to the thiolcarbamic acid formed.

The mole ratio of COS to amine should be about one or less. An excess of COS is definitely undesirable and it is preferred to keep the amine in substantial excess throughout most of the reaction. Since the simplest procedure is to pass gaseous COS into the aqueous medium containing the amine and base, this means that the COS feed should be stopped before a substantial excess builds up. About 5–10% excess with respect to amine and even as much as 25% excess have been used successfully to obtain yields greater than 50% but higher yields have resulted from using an excess of the amine. It is easily possible to obtain essentially none of the desired product by continuing to feed COS after the amine has been exhausted. Apparently the thiolcarbamate decomposes through side reactions in the presence of excess COS.

Reaction temperatures within the range of 0.5° C. are preferred, especially where gaseous COS is passed into aqueous amine in admixture with sodium hydroxide. Absorption of COS is most rapid at this temperature. On the other hand, the reaction has been successfully carried out at 20° C. but the yields are noticeably lower. It is desirable to stir the amine and base for a short time (30 minutes) before starting addition of COS. It has been observed that this increases the rate at which COS is absorbed. Addition of the COS beneath the surface of the reaction mixture is preferred to above the surface feed. With sodium or potassium carbonate absorption of COS is very slow below about 90° C. and it is preferred to conduct the reaction at 10–15° C. No carbon dioxide is evolved indicating that the carbonate goes only to bicarbonate. Other suitable bases include potassium hydroxide, ammonium hydroxide, trimethylamine, triethylamine, pyridine and quinoline.

The concentration is limited only by the physical characteristics of the aqueous salt slurry produced in the reaction. Thus, enough water should be used so that the thiolcarbamic acid salt reaction mixture can be processed satisfactorily. If the slurry is too thick, stirring becomes inefficient. Concentrated solutions are desirable to increase production capacity. Moreover, yields are somewhat higher with concentrated solutions. In reacting some of the less water soluble amines, as for example diisopropylamine, the amine need not be all in solution at the start of the reaction. An aqueous solution layer and organic amine layer may be present initially and sodium diisopropylthiolcarbamate obtained as a slurry.

Condensation of the inorganic salt of the thiolcarbamic acid with an organic halide to form an ester may be carried out simultaneously with preparation of the salt. This involves simply charging the halide along with the amine and base and passing COS into the mixture. Even better results are obtained by concurrently feeding COS and organic halide. Suitable halides comprise allyl chloride, 2,3-dichloro-1-propene, 1,1,3-trichloro-1-propene, 2,3-dibromo-1-propene, ethyl chloride, propyl chloride, butyl chloride, cis-1,2,3-trichloro-2-butene, trans-1,2,3-trichloro-2-butene, 1,3-dichloro-2-butene, 1,3 - dichloro-1-propene, cis-1,2,3-trichloro-1-propene and trans-1,2,3-trichloro - 1-propene.

The reaction of COS with ammonia as well as amines can be effected in the manner described. The principles are applicable to both aromatic and aliphatic amines, examples of which comprise dimethylamine, diethylamine, dipropylamine, diisopropylamine, dibutylamine, diamylamine, diisobutylamine, diallylamine,
bis(2-methoxyethyl)amine,
bis(2-phenoxyethyl)amine,
bis(2-benzyloxyethyl)amine,
piperidine,
5-ethyl-2-methylpiperidine,
morpholine,
2,6-dimethylmorpholine,
piperazine,
2,5-dimethylpiperazine,
pyrrolidine,
4-phenylpiperazine,
2-methylpiperidine,
5-ethyl-3-methylpiperidine,
N-(2-chloroallyl)isopropylamine,
N-(2-chloroallyl)propylamine,
N-ethylaniline,
N-allylisopropylamine,
N-allylpropylamine,
N-allylbutylamine,
N-(2-cyanoethyl)isopropylamine,
N-(2-chloroallyl)-3-methoxypropylamine,
N-ethylcyclohexylamine,
N-methylcyclohexylamine,
N-methylbutylamine,
N-ethylbutylamine,
N-(2-chloroallyl)allylamine,
N-(3-chloroallyl)allylamine,
N-(3-chloroallyl)ethylamine,
N-(3-chloroallyl)propylamine, N-isobutylallylamine,
N-allylmethallylamine,
N-propylmethallylamine,
N-ethylmethallylamine,
N-propargylpropylamine,
bis-(2-chloroethyl)amine,
bis-(2-chloropropyl)amine,
trimethylene diamine,
ethylene diamine,
N,N-dimethyl hydrazine,
2-methoxy-ethylamine,
3-methoxypropylamine,
aniline,
p-anisidine,
p-phenetidine,
p-toluidine,
3,4-dichloroaniline,
ethylamine,
butylamine,
isobutylamine,
amylamine and
2-cyanoethylamine.

*Example 1*

A solution comprising 180 parts by weight (1.0 mole) of 25% dimethylamine, 160 parts by weight (1.0 mole) of 25% sodium hydroxide and 1000 parts by weight of water was prepared and COS then bubbled in at 0.5° C. for 25 minutes or until there was a gain in weight of 60.1 parts by weight (1.0 mole). The reaction mixture was stirred at 0–10° C. for one-half hour longer and the sodium dimethylthiolcarbamate obtained as a 9.16% solution.

*Example 2*

To a glass lined reactor equipped with agitator, brine cooling system, condenser, thermocouples and COS inlet line was charged 127 parts by weight of water, 77.5 parts by weight of 25% sodium hydroxide and 52.2 parts by weight of 98% diisopropylamine. The mixture was stirred and cooled to 0° C. and the reactor purged with nitrogen. To the stirred reaction mixture at 0° C. 85% COS was bubbled in. The impurity in the COS was mainly carbon dioxide. The temperature of the reaction mixture was kept at 0–5° C. during the addition of 31.2 parts by weight of 85% COS. The yield of sodium diisopropylthiolcarbamate was 87–88% (determined by conversion to 2,3-dichloroallyl ester). Using a 1/1 ratio of COS and amine reduced the yield to 80–81%.

*Example 3*

A mixture was prepared comprising 66 parts by weight (0.64 mole) of diisopropylamine, 84 parts by weight (0.61 mole) of potassium carbonate and 161 parts by weight of water. The mixture was cooled to 10–12° C. and 38 parts by weight of 85% COS bubbled in. About three hours were required for absorption of the COS. Stirring was continued for one hour at 11–17° C. to yield a slurry of potassium diisopropylthiolcarbamate. When the reaction was carried out in the presence of 88.5 parts by weight (0.53 mole) of cis- and trans-1,2,3-trichloropropene added before beginning the addition of COS, cis- and trans-2,3-dichloroallyl diisopropyl-thiocarbamate was isolated in a yield of 77%.

*Example 4*

A mixture was prepared composed of 66 parts by weight of diisopropylamine, 125 parts by weight of 25% sodium hydroxide and 161 parts by weight of water. The mixture was cooled to 5° C. and stirred while 81% COS was bubbled in. After about five minutes there was then begun the gradual addition of 120 parts by weight of cis- and trans-1,2,3-trichloropropene. Over a period of about 80 minutes 42 parts by weight of COS was added and the trichloropropene added concurrently over a period of about 90 minutes. The reaction mixture was stirred for 3 hours at a temperature of 6° C. after the addition of COS was complete. This was followed by stirring for one hour at 6–15° C., one-half hour at 15–20° C. and finally 50 minutes at 20–25° C. The product layer was then separated from the aqueous layer, washed once with water and striped at 90–95° C. at 12 mm. pressure for 3 hours to obtain 140 parts by weight of cis- and trans-2,3-dichloroallyl diisopropyl-thiolcarbamate as a lemon yellow oil. This represents a 93% yield based on COS. An additional 5 parts by weight was recovered from the aqueous layer by extraction with trichloropropene.

*Example 5*

A mixture was prepared comprising 18.6 parts by weight (0.25 mole) of trimethylene diamine, 62 parts by weight (1.0 mole) of concentrated ammonium hydroxide and 200 parts by weight of water. The mixture was cooled to 0° C. and COS bubbled in at 0–10° C. until the weight gain was 36 parts by weight. The reaction mixture was stirred at 0–10° C. for one hour to yield an aqueous solution of ammonium trimethylene bis(thiolcarbamate).

Replacing trimethylene diamine with 21.6 parts by weight (0.25 mole) of 70% ethylene diamine in the foregoing procedure resulted in formation of ammonium ethylene bis(thiolcarbamate).

*Example 6*

A mixture was prepared comprising 43.6 parts by weight (0.5 mole) of n-amylamine, 63 parts by weight (1.0 mole) of concentrated ammonium hydroxide and 200 parts by weight of water. The mixture was cooled to 0° C. and COS bubbled in at 0.5° C. until the gain in weight was 36 parts by weight. Stirring was continued for one hour at 0–10° C. From the aqueous ammonium n-amylthiolcarbamate so prepared the allyl ester was obtained in 91% yield.

*Example 7*

A mixture was prepared comprising 30 parts by weight (0.5 mole) of N,N-dimethyl hydrazine, 80 parts by weight (0.5 mole) of 25% sodium hydroxide and 100 parts by weight of water. The mixture was cooled to 0° C. and 38 parts by weight of 85% COS bubbled in at 0.5° C. The addition required about an hour. There was obtained aqueous sodium 3,3-dimethylthiolcarbamate.

*Example 8*

A mixture was prepared comprising 22.5 parts by weight (0.25 mole) of aniline, 25 parts by weight (0.25 mole) of triethylamine and 50 parts by weight of water. The mixture was cooled to 0–5° C. and 13 parts by weight of 85% COS bubbled in over a period of about an hour to obtain aqueous triethylammonium thiolcarbanilate.

*Example 9*

A mixture was prepared comprising 17.6 parts by weight (0.25 mole) of 2-cyanoethylamine, 40 parts by weight of 25% sodium hydroxide and 50 parts by weight of water. The mixture was cooled to 0° C. and 19.5 parts by weight of 85% COS bubbled in at 0–10° C. to obtain aqueous sodium 2-cyanoethylthiolcarbamate.

It is intended to cover all changes and modifications of the examples of the invention herein chosen for purposes of disclosure which do not constitute departures from the spirit and scope of the invention.

This application is a continuation-in-part of copending application Serial No. 642,948, filed February 28, 1957.

What is claimed is:

1. In the process of making thiolcarbamates by reacting COS with primary and secondary amines the improvements which comprise absorbing, at not more than about 20° C. COS in aqueous alkaline medium containing a member of the group consisting of primary and secondary amines, confining the amount of COS to less than one mole per mole equivalent of combining amine, the alkalinity of the said medium being sufficient to neutralize thiolcarbamic acid formed, which alkalinity is due to a member selected from the group consisting of alkali metal hydroxide, ammonium hydroxide, alkali metal carbonate, trimethylamine, triethylamine, pyridine, quinoline, the same amine which is converted to thiolcarbamate and mixtures of said members thereby producing n-substituted thiolcarbamate in the aqueous medium.

2. In the process of making thiolcarbamates by reacting COS with di-(lower alkyl)amines, the improvements which comprise absorbing, at 0–15° C., COS in aqueous alkali metal hydroxide containing di-(lower alkyl) amine, confining the mole ratio of COS to di-(lower alkyl)amine to not more than about one, the said medium also containing about one mole of alkali metal hydroxide per mole of dialkyl amine, thereby producing alkali metal di-(lower alkyl) thiolcarbamate in the aqueous medium.

3. In the process of making thiolcarbamates by reacting COS with di-(lower alkyl)amines, the improvements which comprise absorbing COS in aqueous alkali metal carbonate at 10–15° C. containing di-(lower alkyl)amine and alkali metal carbonate in substantially equal molar proportions, confining the mole ratio of COS to di-(lower alkyl)amine to not more than about one, thereby producing alkali metal di(lower alkyl) thiolcarbamate in the aqueous medium.

4. In the process of making diisopropylthiolcarbamates from COS and diisopropylamine the improvements which comprise passing COS into aqueous sodium hydroxide at 0–15° C. containing substantially equal moles of diisopropylamine and sodium hydroxide, confining the mole ratio of COS to diisopropylamine to less than one, thereby producing sodium diisopropylthiolcarbamate.

5. The process of claim 1 in which the reaction mixture with which the COS is absorbed contains lower (2-alkenyl) chloride and the corresponding ester of the thiolcarbamic acid is isolated.

6. The process of claim 1 in which the reaction mixture with which the COS is absorbed contains lower alkyl chloride and the corresponding ester of the thiolcarbamic acid is isolated.

7. The process of claim 2 in which the reaction mixture with which COS is absorbed contains halogen substituted allyl chloride the halogen being selected from the group consisting of bromine and chlorine and the corresponding ester of the thiolcarbamic acid is isolated.

8. The process of claim 3 in which the reaction mixture with which COS is absorbed contains halogen substituted allyl chloride the halogen being selected from the group consisting of bromine and chlorine and the corresponding ester of the thiolcarbamic acid is isolated.

9. The process of claim 1 in which COS and lower (2-alkenyl) chloride are concurrently fed to the aqueous medium and the corresponding ester of the thiolcarbamic acid is isolated.

10. The process of claim 2 in which both 1,2,3-trichloropropene and COS are concurrently fed to the aqueous medium and the 2,3-dichloroallyl ester of the thiolcarbamic acid is isolated.

References Cited in the file of this patent

UNITED STATES PATENTS 2,854,467   Harman et al. ---------- Sept. 30, 1958

OTHER REFERENCES

Hagelloch: Chem. Ber. 83 (1950), pages 253–61.
Rodd: Chemistry of Carbon Compounds, 1952 page 895.